(12) United States Patent
May et al.

(10) Patent No.: US 6,714,249 B2
(45) Date of Patent: Mar. 30, 2004

(54) PRODUCING PANORAMIC DIGITAL IMAGES BY DIGITAL CAMERA SYSTEMS

(75) Inventors: Michael J. May, Rochester, NY (US); Kenneth A. Parulski, Rochester, NY (US); Eugene R. Rinas, Rochester, NY (US); Brett VanSprewenburg, Henrietta, NY (US); Colleen E. Vermillion, Rochester, NY (US); Clay A. Dunsmore, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/224,547

(22) Filed: Dec. 31, 1998

(65) Prior Publication Data

US 2003/0095193 A1 May 22, 2003

(51) Int. Cl.⁷ .......................... H04N 7/00; H04N 5/225; G03B 17/00
(52) U.S. Cl. .......................... 348/373; 348/36; 396/428
(58) Field of Search .............................. 348/36, 207.99, 348/373; 248/187.1; 33/569, 570, 571; 396/428

(56) References Cited

U.S. PATENT DOCUMENTS

| | | | |
|---|---|---|---|
| 3,131,620 A | | 5/1964 | Schweikhardt et al. |
| 4,232,955 A | | 11/1980 | Numata et al. |
| 4,302,083 A | | 11/1981 | Kawamura et al. |
| 4,329,028 A | | 5/1982 | Numata |
| 4,455,069 A | | 6/1984 | Kawamura |
| 5,138,460 A | | 8/1992 | Egawa |
| 5,262,867 A | | 11/1993 | Kojima |
| 5,264,026 A | | 11/1993 | Paul |
| 5,444,478 A | | 8/1995 | Lelong et al. |
| 5,473,375 A | | 12/1995 | Takayama et al. |
| 5,610,654 A | | 3/1997 | Parulski et al. |
| 5,633,678 A | | 5/1997 | Parulski et al. |
| 5,650,814 A | | 7/1997 | Florent et al. |
| 5,657,073 A | | 8/1997 | Henley |
| 5,659,357 A | | 8/1997 | Miyano |
| 5,668,595 A | | 9/1997 | Katayama et al. |
| 5,682,197 A | * | 10/1997 | Moghadam et al. .......... 348/36 |
| 5,721,585 A | | 2/1998 | Keast et al. |
| 5,870,642 A | * | 2/1999 | Mittelstaedt et al. .. 248/187.13 |
| 5,903,309 A | * | 5/1999 | Anderson ................. 348/231.5 |
| 5,982,951 A | * | 11/1999 | Katayama et al. .......... 348/584 |
| 6,169,575 B1 | * | 1/2001 | Anderson et al. ........ 348/231.2 |
| 6,222,538 B1 | * | 4/2001 | Anderson ................... 345/709 |
| 6,266,083 B1 | * | 7/2001 | Sakaegi et al. ........ 348/207.99 |
| 6,377,294 B2 | * | 4/2002 | Toyofuku et al. ............. 348/36 |
| 6,466,701 B1 | * | 10/2002 | Ejiri et al. .................... 348/49 |
| 6,525,770 B1 | * | 2/2003 | Ueda et al. ................. 348/312 |

OTHER PUBLICATIONS

PC Card Standard Release 2.0, Published by Personal Computer Memory Card International Association, Sunnyvale, California, Sep. 1991.

* cited by examiner

Primary Examiner—Wendy R. Garber
Assistant Examiner—Jason Whipkey
(74) Attorney, Agent, or Firm—Pamela R. Crocker (57) ABSTRACT

A panoramic digital image is produced by providing a digital camera having a memory and which is operable in a first mode for producing individual still digital images, and in a second mode for capturing a series of overlapping digital images to be used in constructing the panoramic digital image. The digital camera is mounted on a stand, rotated on the stand through a series of predetermined positions, and operated in the second mode to capture the series of overlapping digital images. The series of overlapping digital images corresponding to the panoramic digital image is stored in a predetermined location in the memory, and processed to stitch such images together to produce the panoramic digital image.

32 Claims, 8 Drawing Sheets

PRODUCING PANORAMIC DIGITAL IMAGES BY DIGITAL CAMERA SYSTEMS

FIELD OF THE INVENTION

The present invention relates to electronic imaging, and in particular, to producing panoramic digital images.

BACKGROUND OF THE INVENTION

Photographers electronically capturing panoramic images capture a scene as a series of overlapping images. This series of overlapping images represents a greater horizontal field of view, for example, 360 degrees, then could be captured with a single normal photograph.

Digital cameras, such as the Kodak Digital Science DC210™ camera sold by the Eastman Kodak Company, may be used to create 360 degree panoramic images. This is typically done by mounting the digital camera on a stand, such as a tripod, and taking numerous images as the camera is rotated on the stand. Once the desired exposures are taken by rotating the camera, the images are then downloaded from the camera to a host computer via a cable or a removable memory card. A stitching software application, such as PhotoVista™ by LivePicture, may be used to combine the images into a 360 degree panorama. To accomplish this, each image in the set must be individually selected and opened. The software then stitches together the various images to form a panoramic image.

While a professional photographer is able to use the system just described, it is a challenge for a new user to properly perform all the steps. For example, the user may forget to take one of the images at one of the positions, thus leaving a "gap," or may take two pictures at the same position. A novice user may not overlap pictures properly, or may not know how many pictures are required. In addition, if the files from several different sets of 360 degree images are recorded on the same memory card, it may be time consuming for the user to determine which images belong to which set. This is especially problematic if the user fills up a memory card during the middle of a set of images, requiring that a new card be inserted. Also, since the process of taking such sets of images is complex, it is difficult for a new user to understand all of the steps necessary to achieve good results.

Furthermore, to provide a suitable panoramic image, the "stitches" between adjacent images must not be visible. In particular, there should be no brightness or color shift at the "seam" between two images. Therefore, it is desirable to maintain the same exposure and color balance settings for multiple exposures. Current digital still cameras typically include automatic exposure ("AE") and automatic white balance ("AWB") functions that set the exposure parameters (i.e., the lens f-number, exposure time, and gain) and the AWB separately for each image. Because each picture taken in the panoramic series may have objects with different reflectances and colors, the exposure level and AWB settings are usually slightly different from one picture to the next, as the camera is rotated on the stand. These slight differences are quite noticeable when the images are stitched together, since slight differences in brightness or color are very apparent along the "seams" between two images. As a result, the stitching software must take elaborate steps to adjust the individual images during the stitching operation to minimize the visibility of the seam. This is time consuming and yields imperfect results.

Some digital cameras, such as the Kodak DCS 420™ camera sold by the Eastman Kodak Company, include the ability to manually select the exposure parameters (i.e., the lens f-number and exposure time) and use a "default" white balance setting, such as "daylight balance," so that all images in the series use the same exposure parameters. However, since this is a manual operation, the user-selected exposure and white balance settings may be inappropriate for the scene that is being captured, so that all of the images in the series are, for example, overexposed or too reddish in color.

SUMMARY OF THE INVENTION

Accordingly, it is an object of the present invention for inexperienced digital camera users to quickly and easily produce panoramic digital images while minimizing the manual operations and the chance for errors.

This object is achieved by a method of producing a panoramic digital image, comprising the steps of:

(a) providing a digital camera having memory means and which is operable in a first mode for producing individual still digital images, and in a second mode for capturing a series of overlapping digital images to be used in constructing the panoramic digital image;

(b) mounting the digital camera on a stand;

(c) rotating the digital camera on the stand through a series of predetermined positions and operating the digital camera in the second mode to capture the series of overlapping digital images;

(d) storing the series of overlapping digital images corresponding to the panoramic digital image in a predetermined location in the memory means; and (e) processing the series of stored digital images to stitch such images together to produce the panoramic digital image.

It is a further object of the present invention to capture and produce panoramic digital images having substantially no "seams" between adjacent images caused by exposure or color shifts.

This object is achieved by a method of producing a panoramic digital image, comprising the steps of:

(a) providing a digital camera having memory means and which is operable in a first mode for producing individual still digital images, and in a second mode for capturing a series of overlapping digital images to be used in constructing the panoramic digital image, and fixing the white balance and exposure parameters of the digital camera in the second mode after the capture of the first image in the series;

(b) mounting the digital camera on a stand;

(c) rotating the digital camera on the stand through a series of predetermined positions and operating the digital camera in the second mode to capture the series of overlapping digital images;

(d) storing the series of overlapping white balance and exposure fixed digital images corresponding to the panoramic digital image in a predetermined location in the memory means; and (e) automatically stitching the series of stored overlapping white balanced and exposure fixed digital images together to produce the panoramic digital image.

ADVANTAGES

It is an advantage of the present invention to simplify the capture of panoramic digital images.

It is another advantage of the present invention to capture and produce panoramic digital images with substantially reduced errors.

It is yet another advantage of the present invention to automatically stitch together a series of overlapping digital images stored in a folder once a desired folder has been selected.

It is a further advantage of the present invention to capture and produce panoramic digital images with substantially minimized exposure or color shifts between adjacent images.

DETAILED DESCRIPTION OF THE INVENTION

Since electronic still cameras employing electronic sensors are well known, the present description will be directed in particular to elements forming part of, or cooperating more directly with, apparatus in accordance with the present invention. Elements not specifically shown or described may be selected from those known in the art.

Figure 1:
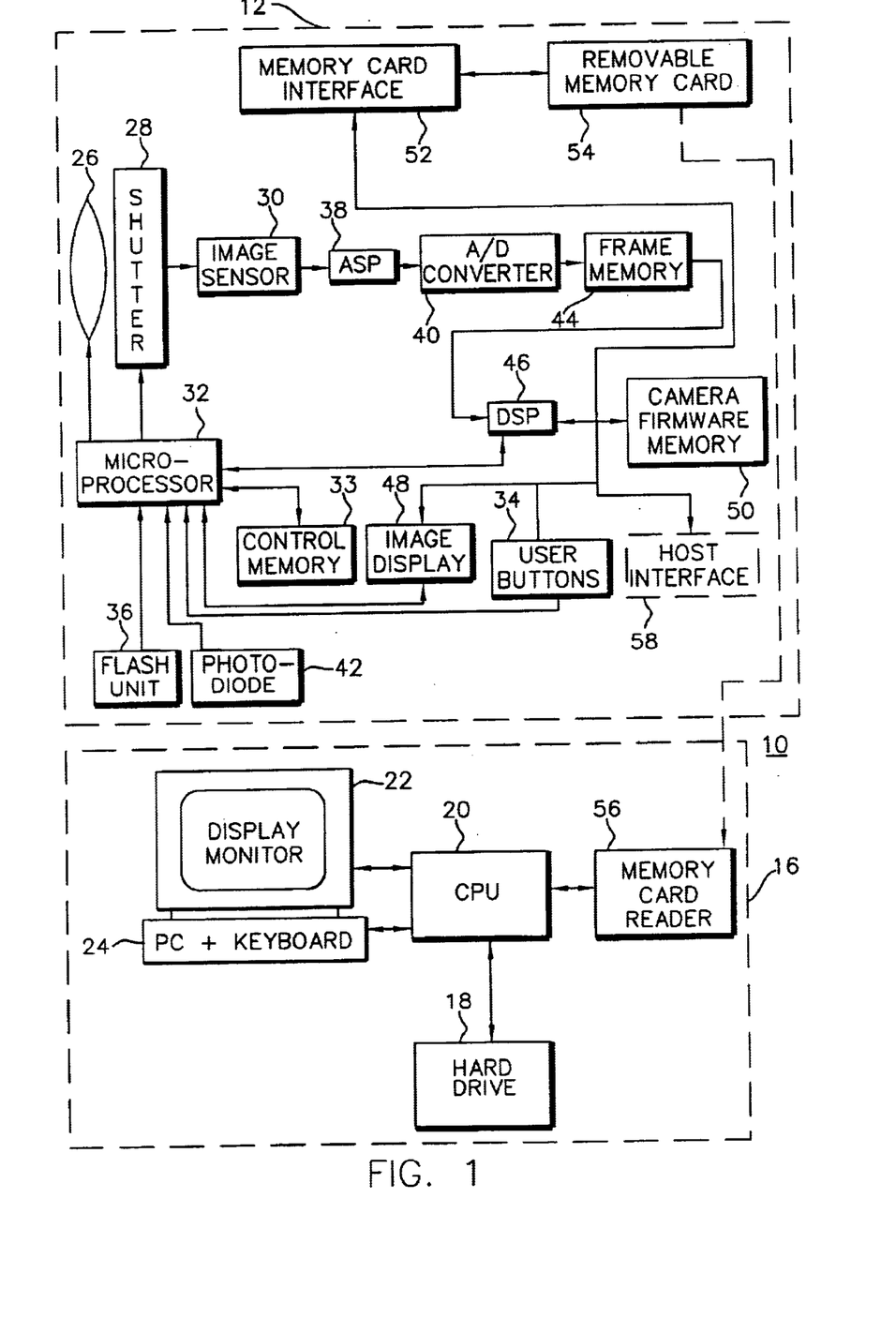
FIG. 1 is a block diagram of a system for capturing and producing a panoramic digital image in accordance with the present invention.

FIG. 1 is a block diagram of system for capturing and producing a panoramic image in accordance with the present invention. The system 10 includes a digital still camera 12; a tripod arrangement 14 (shown in FIG. 3) which serves as a stand to secure the digital still camera 12; and a host computer 16. The host computer 16 includes a hard drive 18, a central processing unit (CPU) 20, a display monitor 22, and a keyboard/mouse 24.

The digital still camera 12 is used to capture a series of exposures to produce the panoramic image. As shown in FIG. 1, the digital still camera 12 includes a zoom lens 26 for directing image light from a scene (not shown) toward an image sensor 30, and a shutter 28 for regulating exposure time. Both the zoom lens 26 and the shutter 28 are controlled by a microprocessor 32 in response to control signals received from a plurality of user input buttons 34 including a shutter release (not shown) for initiating image capture. A flash unit 36 is used to illuminate the scene when needed.

The image sensor 30 includes a discrete number of photosite elements or pixels arranged in a two-dimensional array to form individual photosites corresponding to the pixels of the image. The image sensor 30 can be either a conventional charge coupled device (CCD) sensor, such as, for example, the Kodak KAF-1600 sensor having 1536 columns and 1024 rows of photosites, or a complementary metal oxide semiconductor (CMOS) imager.

The shutter release provided in the user input buttons 34 preferably has two positions: partially depressed (S1) and fully depressed (S2). When a user presses the shutter release so that S1 is enabled, the digital still camera 12 performs autoexposure (AE) using a photodetector signal from a photodiode 42 to set the f-number of the lens 26, the exposure time, and the analog gain level of an analog signal processor (ASP) 38. The AE control of the digital still camera 12 can operate, for example, as described in commonly-assigned U.S. Pat. No. 5,610,654, entitled "Automatic Camera Exposure Control Using Variable ISO Sensor," the disclosure of which is herein incorporated by reference.

After a user fully presses the shutter release so that S2 is enabled, the zoom lens 26 directs image light from the scene onto the image sensor 30, and analog image charge information corresponding to the particular image is produced in respective photosites. The image sensor 30 converts the charge information to an analog image signal corresponding to the particular image captured.

The analog image signal output from the image sensor 30 is analog processed in the ASP 38, and then applied to an analog-to-digital (A/D) converter 40, which converts the analog image signal into a digital image signal. The microprocessor 32 initiates and controls exposure by operation of the shutter 28, by controlling the flash unit 36, by producing control signals needed for driving the image sensor 30 and for clocking image information therefrom, and by enabling the A/D converter 40. The microprocessor 32, which can be, for example, a Motorola 821 Power PC microprocessor, utilizes a control memory 33 and also responds to the user input buttons 34 for operation of the digital still camera 12 in a well-known manner. The digital image signal is stored in buffer memory 44, which is preferably dynamic random access memory (DRAM).

The digital image signal in the DRAM buffer memory 44 is processed to provide automatic white balance (AWB) to adjust the white balance of the digital image signal to correct for the scene illuminant. The white balance correction is performed by a digital signal processor 46. The digital image signal can be processed to provide AWB as described, for example, in commonly-assigned U.S. Pat. No. 5,659,357, entitled "Auto White Adjusting Device," the disclosure of which is herein incorporated by reference. The digital signal processor 46 also provides additional processing of the digital signal, including color correction to correct the camera spectral sensitivities, tone correction to provide the appropriate opto-electronic transfer function, and image sharpening to compensate for lens blur and provide a subjectively sharper image. The digital signal processor 46 also compresses each image according to any one of a number of known image compression algorithms, such as the well-known JPEG (Joint Photographic Experts Group) discrete cosine transformation-based compression algorithm.

The digital signal processor 46 applies a reduced resolution version of the processed digital image signal to an image display 48, such as a color liquid crystal display (LCD), where the user can view the captured image, as well as text and icons. The image display 48 is controlled by the microprocessor 32 in a manner well known. The digital image signal can be stored in memory located in the microprocessor 32 within the digital still camera 12 or, if a removable memory card 54 is present in a memory card slot (not shown) of the digital still camera 12, can be transferred through a memory card interface 52 to the removable memory card 54 which is capable of storing a plurality of digital images.

The removable memory card 54 can be adapted to the CompactFlash interface standard, such as described in the CompactFlash Specification Version 1.3, published by the CompactFlash Association, Palo Alto, Calif., Aug. 5, 1998. Alternatively, the removable memory card 54 can be adapted to the PCMCIA card interface standard, such as described in the *PC Card Standard, Release* 2.0, published by the Personal Computer Memory Card International Association, Sunnyvale, Calif., September, 1991. The removable memory card 54 accordingly contains solid state memory, such as Flash EPROM memory, which the memory card 54 uses to store image data files. Electrical connection between the memory card 54 and the digital camera 12 is maintained through a card connector (not shown) positioned in the memory card interface 52. The memory card interface 52 and the card connector provide, e.g., an interface according to the aforementioned CompactFlash or PCMCIA card interface standard.

The removable memory card 54 can also be inserted into a memory card reader 56 in the host computer 16 which is also adapted to the CompactFlash or PCMCIA interface standard. This enables images stored on the memory card 54 to be downloaded into the host computer 16. The digital image signals can also be sent to a serial interface (not shown) of the host computer 16 through either a cable (not shown), which is connected to the digital camera 12 through a host computer interface 58, or a wireless interface, such as an infrared interface (not shown).

Figure 1A:
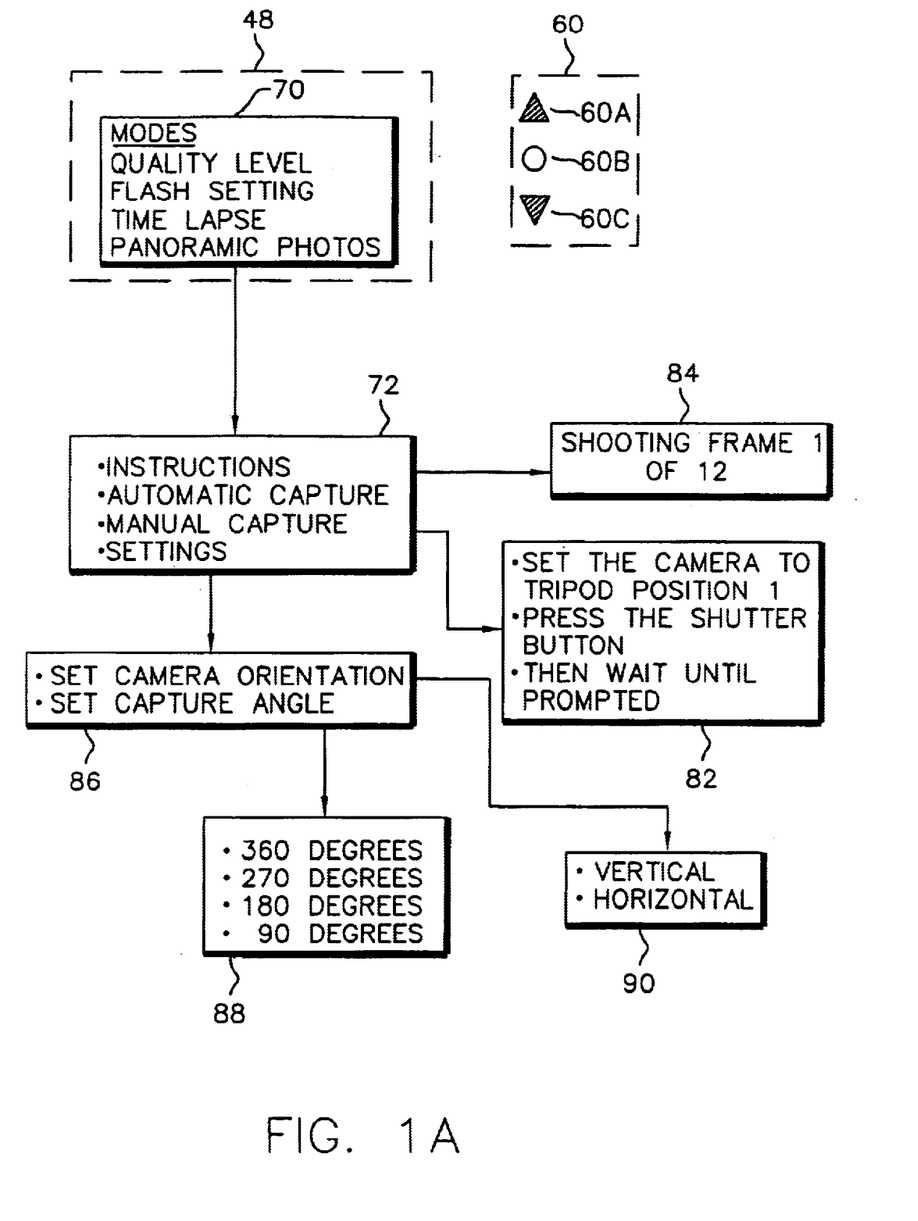
FIG. 1A shows a portion of the graphical user interface of the digital still camera of FIG. 1.

The digital camera 12 further includes a plurality of image display buttons 60 (shown in FIG. 1A) on the LCD 48 that together with the LCD 48 form a graphical user interface (GUI). A portion of the GUI of the digital still camera 12 is shown in FIG. 1A. As shown, the image display buttons 60 include a menu up button 60a, a select button 60b, and a menu down button 60c.

In accordance with the present invention, the digital still camera 12 is operable in a normal mode and a panoramic mode. In the normal mode, the digital still camera 12 captures and produces individual still digital images in a manner well known to those skilled in the art. In the panoramic mode, the digital still camera captures a series of overlapping digital images to be used in constructing a panoramic image. The firmware memory 50 of the digital still camera 12, which is preferably Flash EPROM, stores the instructions for the digital signal processor 46 for implementing the panoramic mode.

As shown in FIG. 1A, on a first screen 70 of the LCD 48, a user can select various features for the operation of the normal mode for capturing individual still digital images by using the menu up button 60a, the select button 60b, and the menu down button 60c. As shown in FIG. 1A, these various features include "Quality level," "Flash setting," and "Time lapse." By selecting the "Quality level" feature, the user can select different compression image quality levels, such as high quality, standard quality, and low quality. By selecting the "Flash setting" feature, the user can choose to turn the flash on for all pictures, to not use the flash at all, or to set the flash to an automatic mode in which the flash is turned on only when the ambient light level is low. By selecting the "Time lapse" feature, the user can capture a series of time lapse images. The time lapse mode allows the user to take a picture, for example, every minute for a total of 10 pictures. As shown in FIG. 1A, the user also has the option of selecting a "Panoramic photos" feature on the first screen 70 of the LCD 48. By selecting the "Panoramic photos" feature, the user can operate the digital still camera 12 in the panoramic mode for capturing a series of overlapping digital images to be used in constructing a panoramic image. The values of these settings are maintained in the control memory 33 by the microprocessor 32.

Figure 2A:
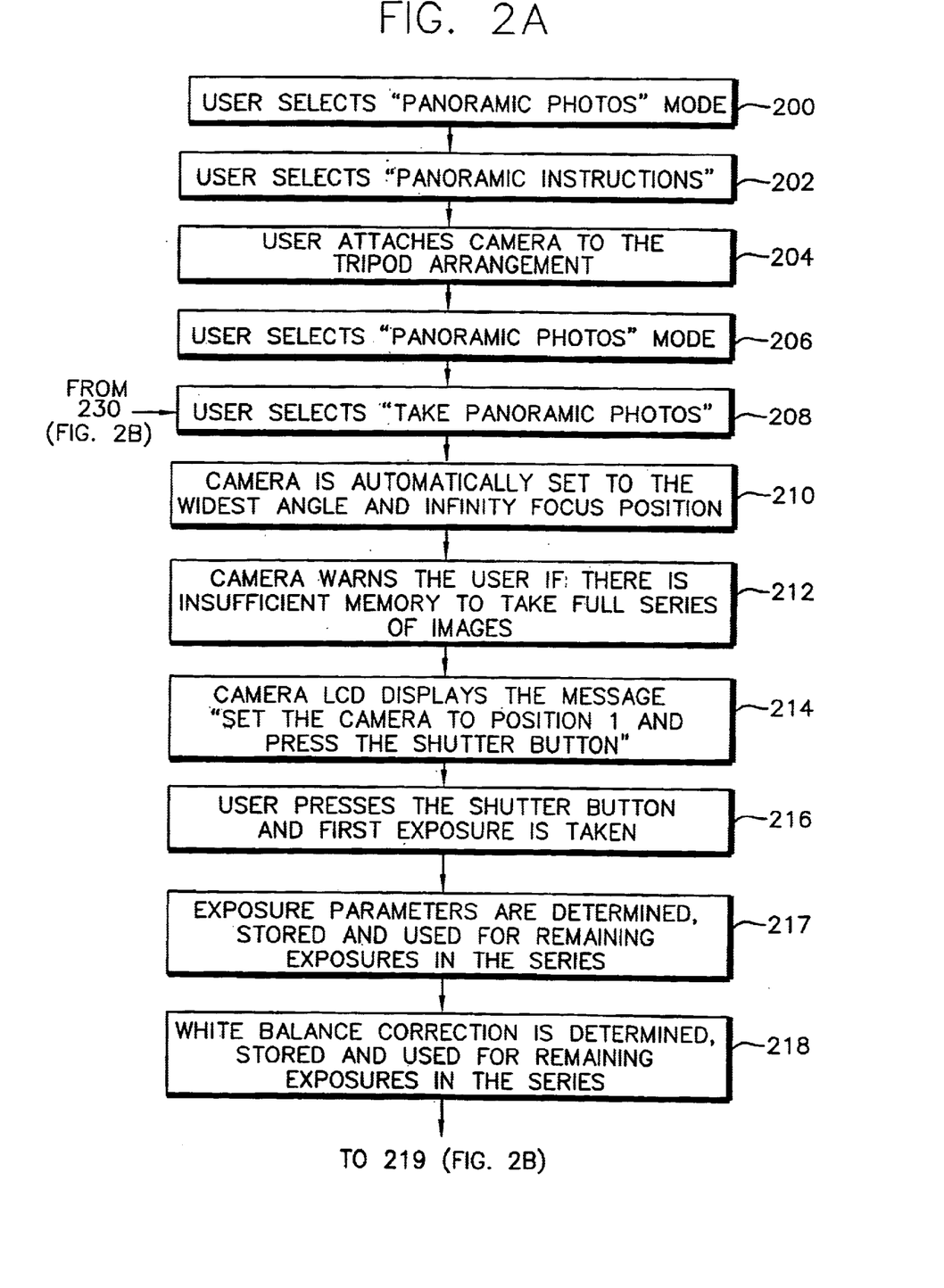
FIGS. 2A–2C, when placed together, are a flow diagram of the operation of the system of FIG. 1 in a panoramic mode to capture and produce the panoramic digital image.
Figure 2B:
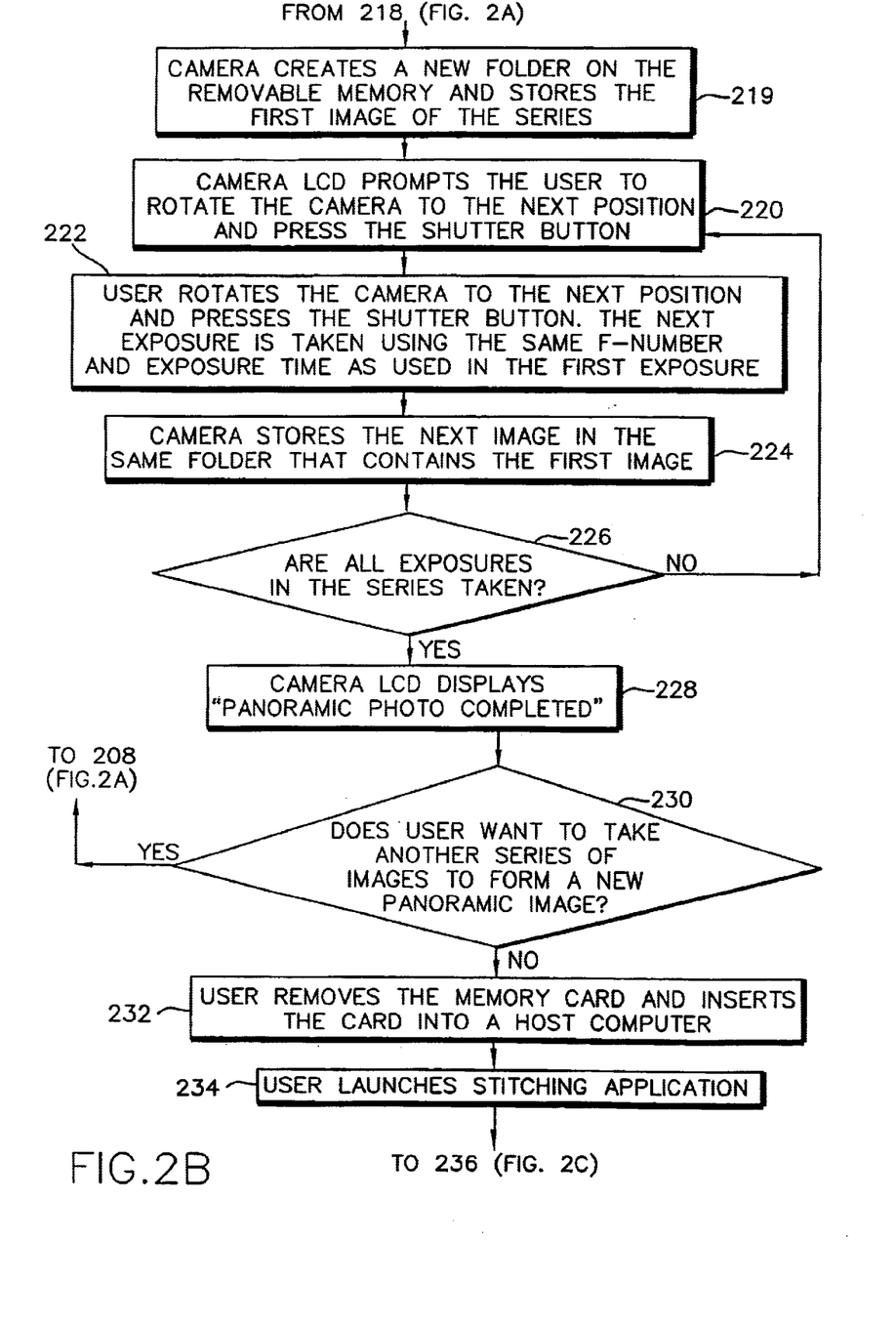
Figure 2C:
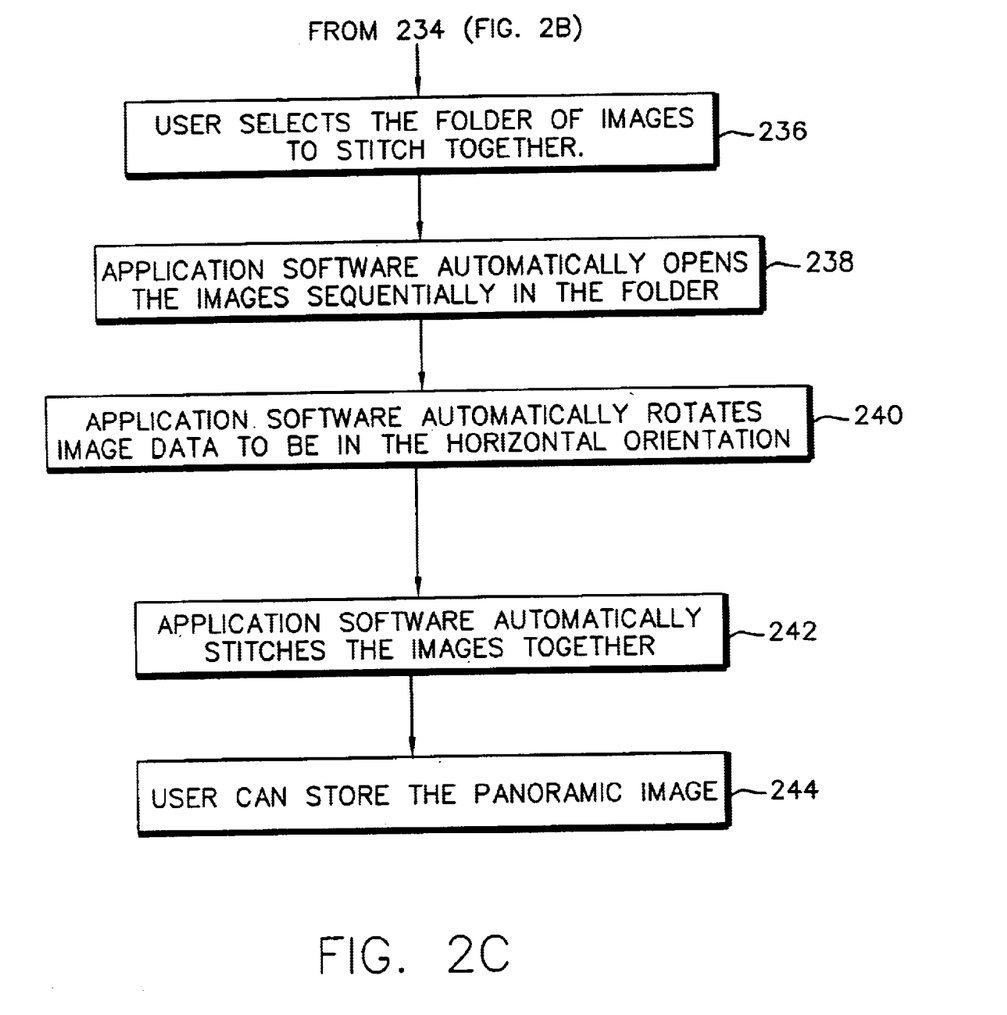
Figure 5:
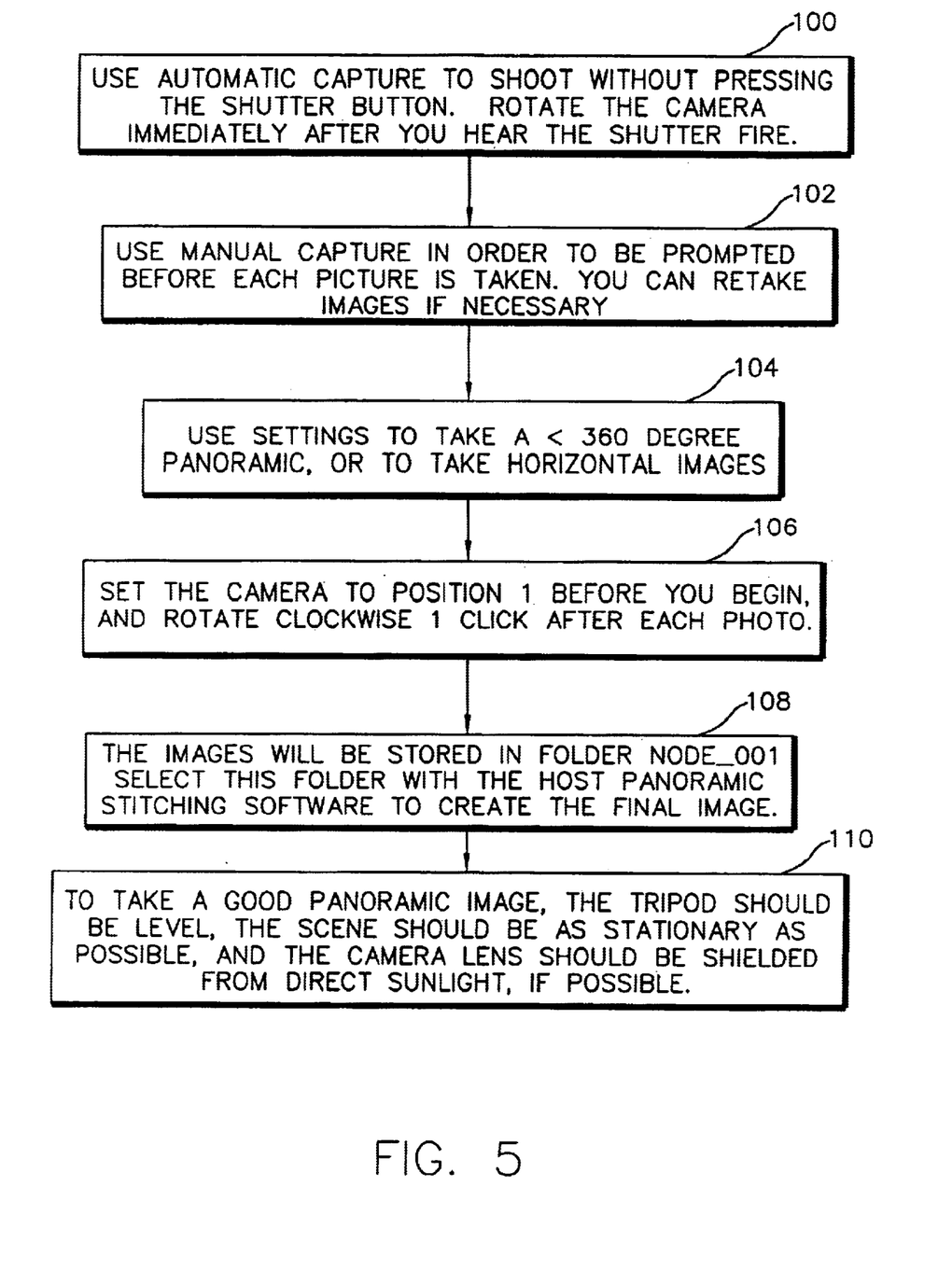
FIG. 5 shows a series of "Panoramic Instructions" screens displayed on the liquid crystal display (LCD) of the digital still camera of FIG. 1.

FIGS. 2A–2C, when placed together, are a flow diagram of the operation of the system 10 in the panoramic mode. In operation, the user selects the "Panoramic photos" mode on the first screen 70 of the LCD 34 as shown in FIG. 1A (block 200). Four options are then displayed on a second screen 72 of the LCD 34: "Instructions," "Automatic capture," "Manual capture," and "Settings." By selecting "Instructions" (block 202), a series of screens 100–110 (shown in FIG. 5) is displayed on the LCD 48. These screens 100–110 describe how to use the "Panoramic photos" mode, as well as panoramic picture taking hints. The user then attaches the digital still camera 12 to the stand 14 (block 204).

Figure 3:
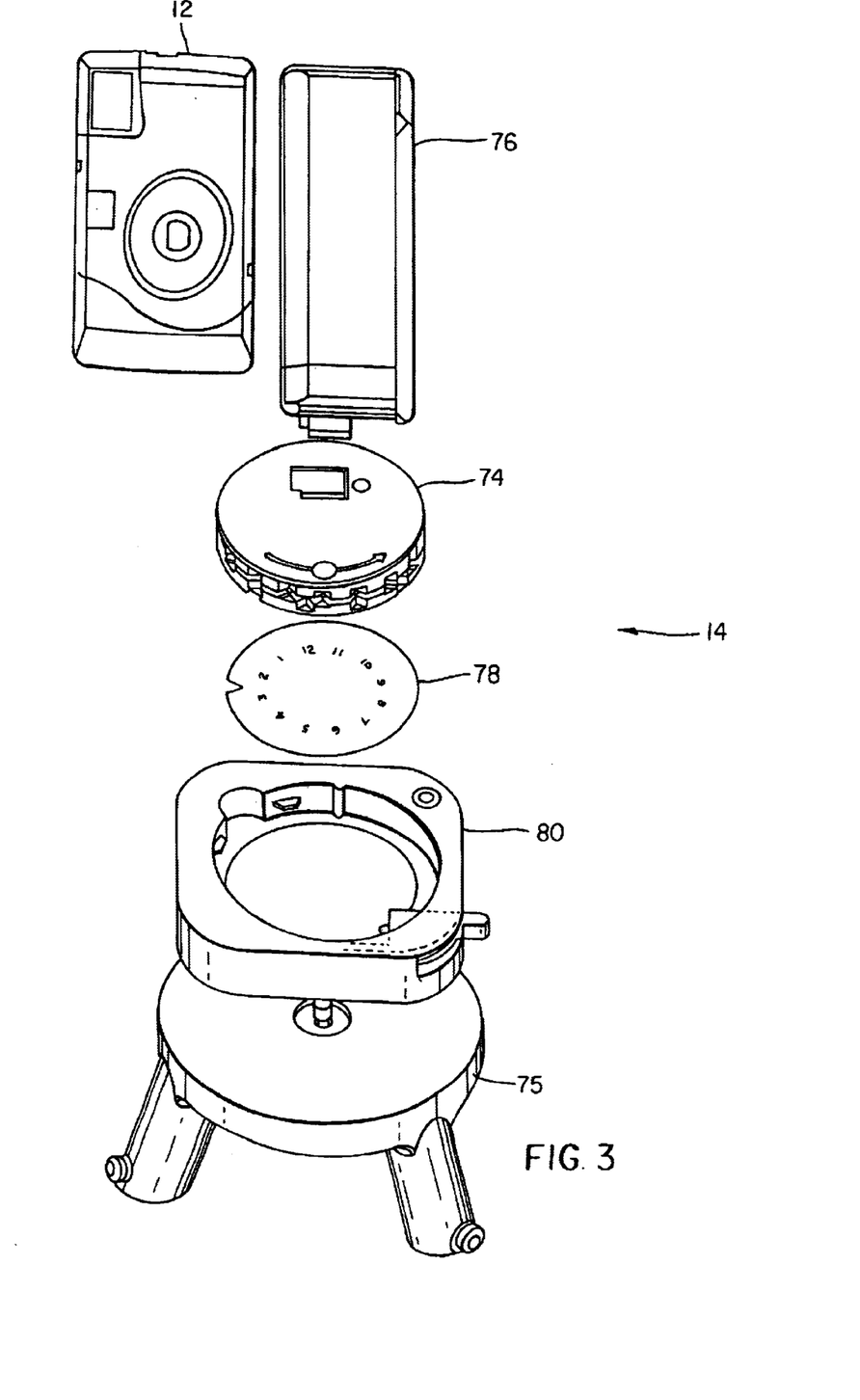
FIG. 3 is a schematic of the tripod arrangement of FIG. 1.

Referring briefly to FIG. 3, a schematic of the tripod arrangement 14 which serves as a stand to secure the digital still camera 12 is shown. As shown, the stand 14 includes a tripod 75, a camera holder 76 for attaching the digital still camera 12 to the stand 14, and a rotatable indexing head 74 which is attached to the top of the tripod 75. The rotatable indexing head 74 is used to rotate the digital still camera 12 the same angle between successive image captures in order to obtain a series of images which can be combined to produce a corresponding panoramic image. Preferably, the rotating indexing head 74 enables the digital still camera 12 to be positioned every 30 degrees to obtain a series of 12 horizontal images or every 22.5 degrees to obtain a series of 16 vertical images. The number of images required for a 360 degree panoramic image depends on the field-of-view of the lens 26 and the optical format of the image sensor 30.

As shown in FIG. 3, the stand 14 further includes a dial 78 attached to the rotatable indexing head 74 for indicating the current image number, and a base 80 to support the dial 78 and the rotating indexing head 74. The digital still camera 12 can be mounted to the stand 14 in either the portrait (i.e., vertical) orientation or the landscape (i.e., horizontal) orientation. However, mounting the digital still camera 12 in the portrait orientation is preferable since it provides the largest possible vertical field of view. For a more detailed description of the stand 14, see commonly assigned U.S. Pat. No. 5,870,642, entitled "Panoramic Support For Camera Permits Horizontal-Format And Vertical-Format Image Recording" by Mittelstaedt et al., the disclosure of which is herein incorporated by reference.

Referring again to FIGS. 2A–2C, once the digital still camera 12 is mounted to the stand 14 (block 204), the user again selects the "Panoramic photos" mode on the first screen 70 of the LCD 34 (block 206), and then selects either "Automatic capture" or "Manual capture" on the second screen 72 of the LCD 34 (block 208), as shown in FIG. 1A. Upon selection of either mode, the zoom lens 26 is automatically set to the widest angle and infinity focus position by the microprocessor 32 (block 210). A warning is also displayed on the LCD 48 of the digital still camera 12 if there is insufficient memory available in the removable memory card 54 to take a full series of images (block 212). When there is insufficient memory, the microprocessor 32 automatically modifies the compression quality level setting, if there is enough memory to store all the images at the lower quality level. Alternatively, the user can override this automatic setting and can remove the current memory card 54 and replace it with a memory card 54 having sufficient available memory space; delete existing files on the memory card 54, reduce the size of the panoramic image, or exit the panoramic mode.

A settings screen 86, shown in FIG. 1A, can be used to change the number of digital images in the panoramic digital image. Preferably, the default setting of the digital still camera 12 in the panoramic mode equals the number of position settings of the rotating indexing head 74 for the camera orientation selected in screen 90 to enable the user to produce a 360 degree panoramic digital image. However, the user can also use screen 88 to produce a 90 degree, 180 degree, or 270 degree panoramic digital image.

By selecting "Manual capture," a list of steps is then displayed on screen 82 (shown in FIG. 1A) of the LCD 48 directing the user to set the digital still camera 12 to position 1 on the rotatable indexing head 74 of the tripod arrangement 14, to press the shutter button, and to then wait until prompted (block 214), as shown in FIG. 1A. Once the user presses the shutter button, a first exposure is taken after a predetermined delay, preferably approximately two seconds (block 216). The delay provides sufficient time for the user to remove his/her hand from the shutter button to reduce possible movement of the digital still camera 12 during exposure. Before the exposure is taken, the microprocessor 32 of the digital still camera 12 determines the scene light level and sets the proper exposure parameters, i.e., the lens f-number, exposure time, and analog gain level of the ASP 38, to provide the proper exposure for the first picture in a manner well known to those skilled in the art. These exposure parameters are stored in the control memory 33 by the microprocessor 32, and are used for all of the remaining exposures in the series to match the exposure levels in order to prevent seams from appearing at the boundary between any two images that are stitched together caused by different exposure levels (block 217).

Once the first image in the series is captured, the analog signal is processed in the ASP 38, digitized in the A/D converter 40, and stored in the buffer memory 44. The digital image signal in the buffer memory 44 is processed by the digital signal processor 46 to provide white balance correction, for example, by applying red ($g_R$), green ($g_G$), and blue ($g_B$) gain factors to the red, green, and blue digital image signals. Once these $g_R$, $g_G$, and $g_B$ AWB parameters are determined for the first captured image in the series, the parameters are stored in the control memory 33 by the microprocessor 32 (block 218). During capture of subsequent images in the series, the AWB parameters are recalled from the control memory 33 by the microprocessor 32 and used to process subsequent digital images in the series of overlapping digital images to produce the panoramic digital image.

It should be noted that determining the AE and AWB parameters for the first captured image, storing the parameters, and recalling such parameters for use in subsequent images can also be used in the time lapse mode of the digital still camera 12.

Figure 4A:
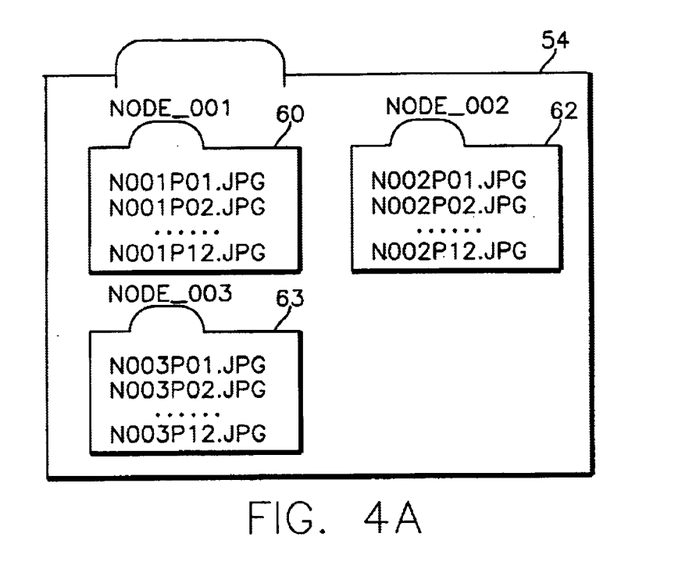
FIG. 4A is an example of the storage structure of a series of digital images used to produce the panoramic digital image.

Referring briefly to FIG. 4A, an example is shown of the storage structure of the series of digital images used to produce the panoramic digital image. Once the first exposure is taken (block 216 in FIG. 2A), a folder 60 is created on the removable memory card 54, and the first image of the series is stored in the folder 60 (block 219 in FIG. 2B). The folders can be automatically named by the digital still camera 12, or manually named and selected by the user as described in commonly-assigned U.S. Pat. No. 5,633,678, entitled "Electronic Still Camera For Capturing And Categorizing Images," the disclosure of which is herein incorporated by reference. The name of the image files is selected to indicate which folder it is stored in. For example, as shown in FIG. 4A, the folder 60 can be named "NODE001," and the first image can be named "N001P01.JPG." Once the first image is stored, the LCD 48 of the digital still camera 12 prompts the user to rotate the digital still camera 12 to the second position on the rotatable indexing head 74 and to press the shutter button (block 220). Once the user presses the shutter button, the second exposure is taken after a predetermined delay of approximately two seconds (block 222). In accordance with the present invention, the second exposure is taken using the same AWB parameters, and the same AE parameters (i.e., lens f-number, exposure time, and analog gain level) as was used for the first exposure to eliminate "seams" between the images when they are stitched together. Such AE and AWB parameters are recalled from the control memory 33 by the microprocessor 32. The second image is then stored in the folder 60 which contains the first image (block 224). In the example above and as shown in FIG. 4A, the second image can be named as "N001P02.JPG" and would be stored in folder "NODE001" along with the first image "N001P01.JPG."

The user is then prompted to take the remaining exposures in the left to right circular sequence (block 226) in the same manner as for the second exposure. Each image is stored in the same folder 60 as the first and second images. After the final exposure of the series is taken, the LCD 48 displays "Panoramic Photo completed" (block 228). At this point, the user may choose to take additional panoramic images by moving the tripod arrangement 14 to additional locations and taking additional series of images (block 230). In this case, if second and third series of images were to be taken, new folders 62 and 63, respectively, would be created and named, for example, "NODE002" and "NODE003," respectively, as shown in FIG. 4A.

If the user selects the "Automatic capture" mode rather than the "Manual capture" mode, the user only presses the shutter button once, and the digital still camera 12 automatically takes pictures, for example, every 5 seconds, as the user rotates the digital still camera 12 on the stand 14 after hearing the shutter 28 close as each image is taken. Screen 84 of the LCD 48, shown in FIG. 1A, indicates to the user which frame is being taken.

After all desired exposures have been taken, the user removes the removable memory card 54 containing the images stored in the folders from the digital still camera 12, and inserts the memory card 54 into the host computer 16 (block 232). Alternatively, the digital still camera 12 can be attached to the host computer 16 using a wire interface using, for example, a USB or RS-232 interface. Conventional application program software for stitching the series of selected images together to produce a panoramic image in accordance with the present invention is incorporated into the hard drive 18 of the host computer 16, and then downloaded to a computer random access memory (RAM) (not shown) when the program is used by the CPU 20. Stitching software is well known in the art, but such software should be modified in accordance with the present invention. An example of a commercially available stitching software application is PhotoVista™ provided by LivePicture.

Figure 4B:
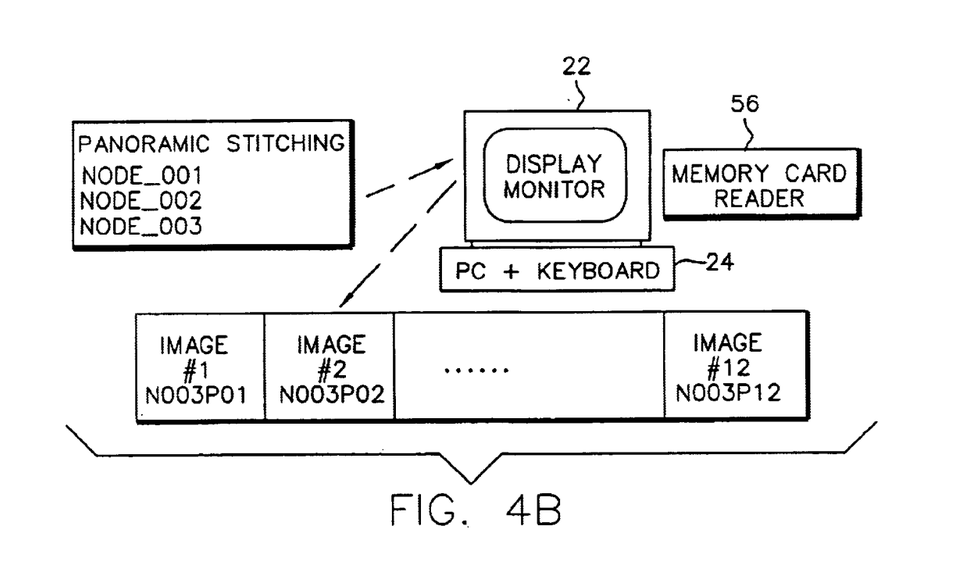
FIG. 4B shows a block diagram depicting the image stitching performed by the application software of the host computer of FIG. 1.

FIG. 4B shows a block diagram depicting the image stitching performed by the application software of the host computer 16. On the host computer 16, the user launches the stitching application (block 234) and selects the desired folder of images to be stitched to create the panoramic image (block 236), as shown in FIG. 4B. Once the folder is selected, the application software automatically opens the images in sequential order from left to right (block 238). The application software also rotates the image data to be in the horizontal orientation since the images were captured with the digital still camera 12 positioned in the vertical orientation (block 240). The application software then automatically stitches the images together to provide the panoramic image as shown in FIG. 4B (block 242). The resulting panoramic image can be viewed on the display monitor 22, and can then be stored on the hard drive 18 or the removable memory card 54 (block 244), printed on a local printer (not shown), or added to a web page in a manner well known to those skilled in the art.

The panoramic mode is turned off when the user either inactivates the panoramic mode, or when the digital camera 12 is turned off. Alternatively, the panoramic mode can be turned off when all images in a given series have been captured.

The invention has been described in detail with particular reference to a preferred embodiment thereof. However, it will be appreciated that variations and modifications can be effected by a person of ordinary skill in the art without departing from the spirit and scope of the invention. For example, the control memory 33 could be incorporated into the microprocessor 32 or the frame memory 44, the white balance correction gain factors could be applied by the ASP 38, or the digital still camera 12 could store unprocessed image data from the frame memory 44, and the image processing performed by the digital signal processor 46, including the AWB processing, could be performed by the CPU 20 of the host computer 16. In addition, as was previously described, the process of determining AE and AWB parameters for a first captured image, or prior to storing a first captured image, storing the parameters, and recalling the parameters for use in subsequent images is also useful for time lapse or burst image features. These features capture a series of images with the digital still camera pointing in the same direction, using either a relatively long delay between successive images (for time delay feature) or a very short delay between images (for burst image feature). These features do not require the panoramic mode or panoramic stitching software.

Parts List
10 system
12 digital still camera
14 stand
16 host computer
18 hard drive
20 central processing unit
22 display monitor
24 keyboard/mouse
26 zoom lens
28 shutter
30 image sensor
32 microprocessor
33 control memory
34 user buttons
36 flash unit
38 analog signal processor
40 analog-to-digital converter
42 photodiode
44 frame memory
46 digital signal processor
48 image display
50 firmware memory
52 memory card interface
54 removable memory card
56 memory card reader
58 host interface
60 image display buttons
60a menu up button
60b select button
60c menu down button
70 first LCD screen
72 second LCD screen
74 rotatable indexing head
75 tripod
76 camera holder
78 dial
80 mount
82 "Manual capture" LCD screen
84 "Automatic capture" LCD screen
86 "Settings" LCD screen
88 "Capture Angle" LCD screen
90 "Camera Orientation" LCD screen

What is claimed is:

1. Method of producing a panoramic digital image, comprising the steps of:
  (a) providing a digital camera having memory means and being operable in a panoramic mode for capturing a series of overlapping digital images to be used in constructing the panoramic digital image;
  (b) mounting the digital camera on a stand, the stand including means for indicating an image number for the series;
  (c) rotating the digital camera on the stand through a series of predetermined positions and operating the digital camera in the panoramic mode to capture the series of overlapping digital images;
  (d) storing the series of overlapping digital images corresponding to the panoramic digital image in a predetermined location in the memory means; and
  (e) automatically stitching the series of stored overlapping digital images together to produce the panoramic digital image.

2. The method according to claim 1 wherein the storing step includes storing the series of overlapping digital images in a uniquely named folder in the memory means.

3. The method according to claim 1 wherein the digital camera includes a user display indicating the image number.

4. The method according to claim 1 further including the step of providing instructions to a user to assist the user in taking the series of overlapping digital images to be used in constructing the panoramic digital image.

5. The method according to claim 1 further including the steps of displaying the captured images on a display, and storing instructions to be displayed on the display to assist a user in capturing the series of overlapping digital images.

6. The method according to claim 1 further including the step of automatically setting a compression quality level to enable the series of overlapping digital images to be stored in the memory means.

7. Digital camera system for capturing a panoramic digital image, comprising:
  (a) a digital camera having memory means and being operable in a panoramic mode for capturing a series of overlapping digital images to be used in constructing the panoramic digital image;
  (b) a stand for mounting the digital camera, the stand including means for indicating an image number for the series;
  (c) means for rotating the digital camera on the stand through a series of predetermined positions and operating the digital camera in the panoramic mode to produce the series of overlapping digital images; and
  (d) means for storing the series of overlapping digital images corresponding to the panoramic digital image in a predetermined location in the memory means.

8. The digital camera system according to claim 7 wherein the series of overlapping digital images are stored in a uniquely named folder in the memory means.

9. The digital camera system according to claim 7 wherein the digital camera includes a user display indicating the image number.

10. The digital camera system according to claim 7 wherein the digital camera further includes means for providing instructions to a user to assist the user in taking the series of overlapping digital images to be used in constructing the panoramic digital image.

11. The digital camera system according to claim 7 wherein the digital camera further includes a display for displaying the captured images, and means for storing instructions to be displayed on the display to assist a user in capturing the series of overlapping digital images.

12. The digital camera system according to claim 7 wherein the digital camera further includes means for automatically setting a compression quality level to enable the series of overlapping digital images to be stored in the memory means.

13. Method of producing a panoramic digital image, comprising the steps of:
   (a) providing a digital camera having memory means and being operable in a panoramic mode for capturing a series of overlapping digital images to be used in constructing the panoramic digital image, and fixing the white balance and exposure parameters of the digital camera in the panoramic mode when capturing the digital images in the series of overlapping digital images;
   (b) mounting the digital camera on a tripod, the tripod including means for indicating an image number for the series;
   (c) rotating the digital camera on the tripod through a series of predetermined positions and operating the digital camera in the panoramic mode to capture the series of overlapping white balanced and exposure fixed digital images;
   (d) storing the series of overlapping white balance and exposure fixed digital images corresponding to the panoramic digital image in a predetermined location in the memory means; and
   (e) automatically stitching the series of stored overlapping white balanced and exposure fixed digit images together to produce the panoramic digital image.

14. The method according to claim 13 wherein the white balance and exposure fixing step includes storing the white balance and exposure parameters.

15. The method according to claim 13 wherein the white balance and exposure parameters are determined using the first image in the series of overlapping digital images, and wherein such parameters are used when capturing subsequent digital images in the series.

16. The method according to claim 13 wherein the digital camera includes a user display indicating the image number.

17. Digital camera system for capturing a panoramic digital image, comprising:
   (a) a digital camera having memory means and being operable in a panoramic mode for capturing a series of overlapping digital images to be used in constructing the panoramic digital image, and means for fixing the white balance and exposure parameters of the digital camera in the panoramic mode when capturing the digital images in the series of overlapping digital images;
   (b) a stand for mounting the digital camera, the stand including means for indicating an image number for the series;
   (c) means for rotating the digital camera on the stand through a series of positions and operating the digital camera in the panoramic mode to produce the series of overlapping white balanced and exposure fixed digital images; and
   (d) means for storing the series of white balance and exposure fixed overlapping digital images corresponding to the panoramic digital image in a predetermined location in the memory means.

18. The digital camera system according to claim 17 wherein the means for fixing the white balance and exposure of the digital camera includes means for storing the white balance and exposure parameters and means for adjusting the white balance and exposure of the series of overlapping digital images.

19. The digital camera system according to claim 18 wherein the exposure parameters include lens f-number, exposure time, and analog gain level.

20. The digital camera system according to claim 17 wherein the white balance and exposure parameters are determined using the first image in the series of overlapping digital images, and wherein such parameters are used when capturing subsequent digital images in the series.

21. The digital camera system according to claim 17 wherein the digital camera includes a user display indicating the image number.

22. Method of producing panoramic digital images, comprising the steps of:
   (a) providing a digital camera having memory means and being operable in a panoramic mode for capturing a series of overlapping digital images to be used in constructing the panoramic digital image;
   (b) mounting the digital camera on a stand, the stand including means for indicating an image number for the series;
   (c) rotating the digital camera on the stand through a series of predetermined positions and operating the digital camera in the panoramic mode to produce the series of overlapping digital images;
   (d) selecting storage locations corresponding to a folder for each series of overlapping digital images and storing each series of overlapping digital images in the selected storage locations in the memory means; and
   (e) selecting a desired folder corresponding to a desired panoramic digital image and automatically stitching the series of stored overlapping digital images in the desired folder together to produce the panoramic digital image.

23. The method according to claim 22 wherein the digital camera includes a user display indicating the image number.

24. Method of producing panoramic digital images, comprising the steps of:
   (a) providing a digital camera having a removable memory card and being operable in a panoramic mode for capturing a series of overlapping digital images to be used in constructing the panoramic digital image;
   (b) mounting the digital camera on a stand, the stand including means for indicating an image number for the series;
   (c) rotating the digital camera on the stand through a series of predetermined positions and operating the digital camera in the panoramic mode to produce the series of overlapping digital images;
   (d) selecting storage locations corresponding to a folder for each series of overlapping digital images and storing each series of overlapping digital images in the selected storage locations in the removable memory card;

(e) removing the memory card from the digital camera and inserting it into a host computer; and (f) selecting on the host computer, a desired folder corresponding to a desired panoramic digital image and stitching the series of stored overlapping digital images together to produce the panoramic digital image.

25. The method according to claim 24 wherein the digital camera includes a user display indicating the image number.

26. System for capturing and producing a panoramic digital image, comprising:

(a) a digital camera having a removable memory card and being operable in a panoramic mode for capturing a series of overlapping digital images to be used in constructing the panoramic digital image;

(b) a stand for mounting the digital camera, the stand including means for rotating the digital camera through a series of predetermined positions when the digital camera is operating in the panoramic mode to produce the series of overlapping digital images, and means for indicating an image number for the series;

(d) means far selecting a storage location corresponding to a folder for the series of overlapping digital images and for storing the series of overlapping digital images in the selected storage location in the removable memory card; and (e) a host computer having an interface for receiving the removable memory card and including means for processing the series of stored digital images in a desired folder and for stitching such images together to produce the panoramic digital image.

27. The system according to claim 26 wherein the processing means further includes means for automatically stitching together the series of stored digital images when a folder is selected to produce the panoramic digital image.

28. The system according to claim 26 wherein the digital camera includes a user display indicating the image number.

29. System for capturing and producing a panoramic digital image, comprising:

(a) a digital camera having a removable memory card and being operable in a panoramic mode for capturing a series of overlapping digital images to be used in constructing the panoramic digital image, and means for fixing the white balance and exposure parameters of the digital camera in the panoramic mode after the capture of the first image in the series to be used when capturing subsequent digital images in the sales of overlapping digital images;

(b) a stand for mounting the digital camera, the stand including means for rotating the digital camera through a series of predetermined positions when the digital camera is operating in the panoramic mode to produce the series of overlapping digital images, and means for indicating an image number for the series;

(d) means for selecting a storage location corresponding to a folder for the series of overlapping digital images and for storing the series of overlapping digital images in the selected storage location in the removable memory card; and (e) a host computer having an interface for receiving the removable memory card and including means for automatically stitching the series of stored white balance and exposure fixed digit images in a desired folder together to produce the panoramic digital image.

30. The system according to claim 29 wherein the digital camera includes a user display indicating the image number.

31. Method of producing a series of overlapping digital images, comprising the steps of:

(a) providing a digital camera having memory means and being operable in a panoramic mode for capturing a series of overlapping digital images to be used in constructing a panoramic digital image;

(b) mounting the digital camera on a stand, the stand including means for indicating an image number for the series;

(c) rotating the digital camera on the stand through a series of predetermined positions and operating the digital camera in the panoramic mode to capture the series of overlapping digital images; and (d) storing the series of overlapping digital images corresponding to the panoramic digital image in a predetermined location in the memory means.

32. Method of producing a series of overlapping digital images, comprising the steps of:

(a) providing a digital camera having memory means and being operable in a panoramic mode for capturing a series of overlapping digital images to be used in constructing a panoramic digital image, the digital camera including a user display indicating the image number;

(b) mounting the digital camera on a stand, the stand including means for indicating an image number for the series;

(c) rotating the digital camera on the stand through a series of predetermined positions and operating the digital camera in the panoramic mode to capture the series of overlapping digital images; and (d) storing the series of overlapping digital images corresponding to the panoramic digital image in a predetermined location in the memory means.

* * * * *